No. 677,077. Patented June 25, 1901.
F. GRINNELL.
VALVE.
(Application filed Dec. 17, 1897.)
(No Model.)

WITNESSES,
John Henshaw
R. A. Bates.

INVENTOR,
Frederick Grinnell,
BY Wilmarth H. Thurston
ATT'Y.

UNITED STATES PATENT OFFICE.

FREDERICK GRINNELL, OF NEW BEDFORD, MASSACHUSETTS, ASSIGNOR TO THE GENERAL FIRE EXTINGUISHER COMPANY, OF NEW YORK, N. Y.

VALVE.

SPECIFICATION forming part of Letters Patent No. 677,077, dated June 25, 1901.

Application filed December 17, 1897. Serial No. 662,337. (No model.)

*To all whom it may concern:*

Be it known that I, FREDERICK GRINNELL, of New Bedford, in the county of Bristol and State of Massachusetts, have invented certain new and useful Improvements in Valves; and I do hereby declare the following specification, taken in connection with the accompanying drawings, forming a part of the same, to be a full, clear, and exact description thereof.

The invention relates to that class of valves in which a liquid, usually water, under pressure is held in check by a valve which is held to its seat by the action of a less pressure and is released and forced from its seat by the action of the liquid when said light pressure is reduced. Such valves are especially useful in connection with automatic sprinkler systems in which the water is held in check by a valve held to its seat by the action of a light air-pressure in the system, and the present invention is especially designed for use in connection with such systems, although its use is not confined thereto.

Valves of the above class are usually provided with a movable member which is subjected upon one side to the light pressure in the system and upon the other side to a less pressure, usually about atmospheric, said movable member being arranged to hold the valve closed by reason of its greater area or by reason of the connections between said member and the valve. When such a valve is opened by the reduction of the light pressure in the system, the system is filled with water and a column of water is formed above the movable member. Should the valve for any reason now return to its seat, the column of water above the movable member may be of sufficient height to hold the valve to its seat and prevent any further flow of water to the system. A valve thus held to its seat is said to be "columned." With this class of valves it is desirable, especially in connection with fire-extinguisher systems, where it is essential that the supply of water shall not be prematurely shut off after the valve has been opened by the opening of a sprinkler, to provide means for preventing columning.

The object of this invention is to provide simple and efficient means for preventing columning of the valve after it has once opened, and this is accomplished by providing means, preferably a latch or stop, for preventing the closing of the valve, which means is operated by the movement of the valve in opening.

Figure 1:
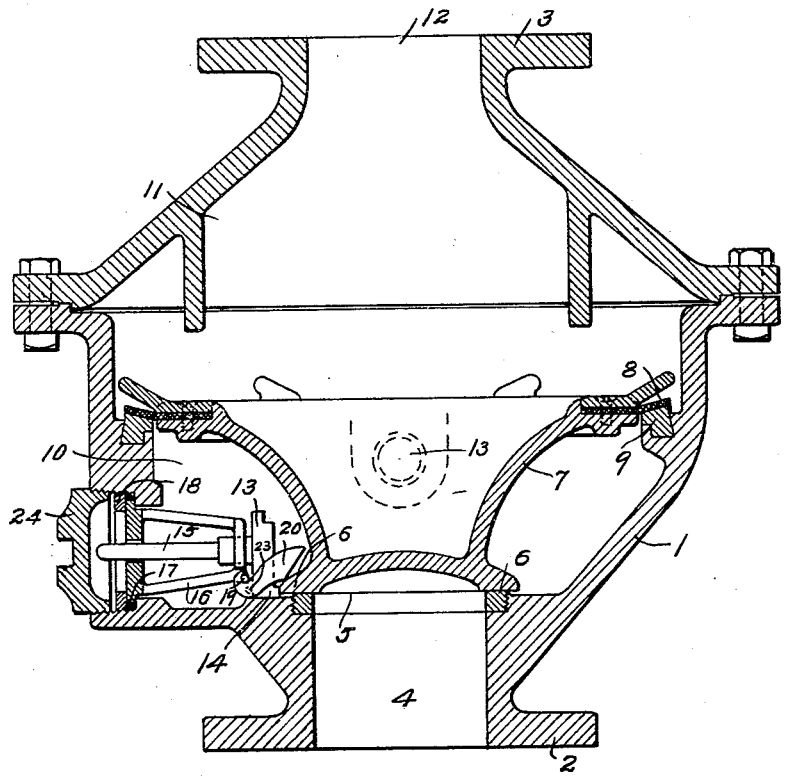

In the accompanying drawings a preferred form of the invention is shown in connection with a differential valve similar to that shown in Figure 1 of my Patent No. 372,220, dated October 25, 1887; but it will be understood that the invention may be used with equal advantage in connection with the various forms of valves wherein a liquid under pressure is held in check by a valve which is held closed by the action of a lighter pressure.

The construction shown embodies features of invention set forth in claims of an application of even date, Serial No. 662,336.

Figure 2:
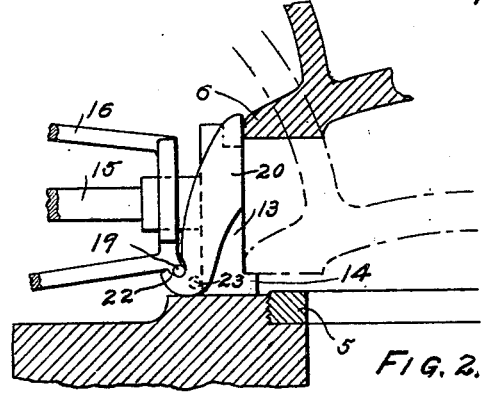
Figure 3:
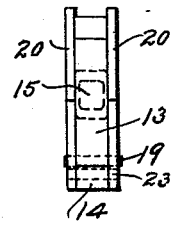

Referring to the drawings, Fig. 1 is a sectional view of an embodiment of the present invention applied to a differential valve. Fig. 2 is an enlarged detail showing the parts in the position they occupy when the valve has opened, and Fig. 3 is a detail end view.

Referring to Fig. 1, 1 is the valve-casing, provided with flanges 2 and 3 for connecting said casing to a supply-pipe and delivery-pipe, respectively. The inlet 4 is provided with a valve-seat 5 for a valve 6. The valve 6 is formed on a dish-shaped member 7, which is provided with a flexible ring 8, arranged to seat upon the valve-seat 9. In this form of valve the member 7 and the wall of the casing 1 between the valve-seats 5 and 9 form an intermediate or supplemental chamber 10, and the space above the member 7 forms a light-pressure chamber 11, which is connected with the system through the outlet 12. The chamber 10 is preferably connected with the atmopshere through the usual drip-pipe 13; but the pressure in said chamber may, if desired, be either above or below atmospheric pressure, provided said pressure is less than the pressure in chamber 11. The walls of the movable member 7 between the chambers 10 and 11 are subjected to light pressure on one side and to a less pressure on the other side, and the member 7 is connected to the main valve by being formed integral therewith. The valve-seat 9 is of such a diameter that the pressure upon the top of the member 7 exerted by the light pressure will be sufficient to hold the valve 6 to its seat.

As thus far described the valve is of a well-known construction in common use and is merely shown as an illustration of one of many forms of valves to which the invention may be applied. The means for preventing columning of the valve embodying the present invention will now be described.

A latch or stop, in the form shown consisting of the block 13, is arranged adjacent the valve-seat 5 and is provided with a lip or shoulder 14, adapted to pass under the valve when said valve opens, and thus prevent the closing of the valve. The block 13 is secured or formed on a rod or bar 15, which is guided in a frame 16, supported in the valve-casing 1. The frame 16 is provided with a flange 17, which fits in a recess in the casing and is held in place by a screw-ring 18. The frame 16 is provided with a pin 19, which projects beyond each side of the frame and forms pivots for two lever-arms 20, which rest upon the ledge 21, adjacent the valve-seat 5, and are provided with hook-bearings 22, which engage said pin. A pin 23 connects the arms 20 and is arranged to bear against the back of block 13. The arms 20 extend above the valve 6, and when said valve is closed they rest on the valve, as shown in Fig. 1. When the valve opens, the arms 20 are moved into the position shown in Fig. 2 and the pin 23 forces the block 13 forward and carries the lip 14 under the valve, so that said valve cannot close and cannot, therefore, become columned. The block 13 may be withdrawn when the valve is to be reset by removing the plug 24.

What I claim as my invention, and desire to secure by Letters Patent, is—

1. The combination with a valve, of means for holding said valve closed against pressure by the action of a less pressure, and means positively operated by the valve in opening for preventing the valve from closing.

2. The combination with a valve, of means for holding said valve closed against pressure by the action of a less pressure, and a stop positively operated by the valve in opening for preventing the valve from closing.

3. The combination with a valve, of means for holding said valve closed against pressure by the action of a less pressure, a stop for preventing said valve closing, and an arm for operating said stop arranged in the path of the valve and positively operated thereby.

4. The combination with a valve, of means for holding said valve closed against pressure by the action of a less pressure, a stop provided with a shoulder for supporting said valve, and means operated by the valve in opening for positively moving said stop into operative position.

5. The combination with a valve, of means for holding said valve closed against pressure by the action of a less pressure, a block provided with a shoulder for supporting the valve, a pivoted lever operated by the valve for moving said block into operative position.

6. The combination with a valve, of means for holding said valve closed against pressure by the action of a less pressure, a sliding block provided with a lip, a lever provided with a projection engaging said block, said lever being arranged in the path of the valve in opening.

7. The combination with a valve, a light-pressure chamber, a supplemental chamber, a movable member between said chambers acting to hold said valve to its seat, and means positively operated by the valve in opening for preventing the valve from closing.

8. The combination with a differential valve, of a stop positively operated by the valve in opening for preventing said valve from closing.

9. The combination with a differential valve, of a stop for preventing said valve from closing, a lever in the path of the valve for moving said stop into operative position.

FREDERICK GRINNELL.

Witnesses:
W. H. THURSTON,
R. A. BATES.